Oct. 23, 1962
W. L. McGRATH
3,059,448
AIR CONDITIONING APPARATUS
Filed May 1, 1958
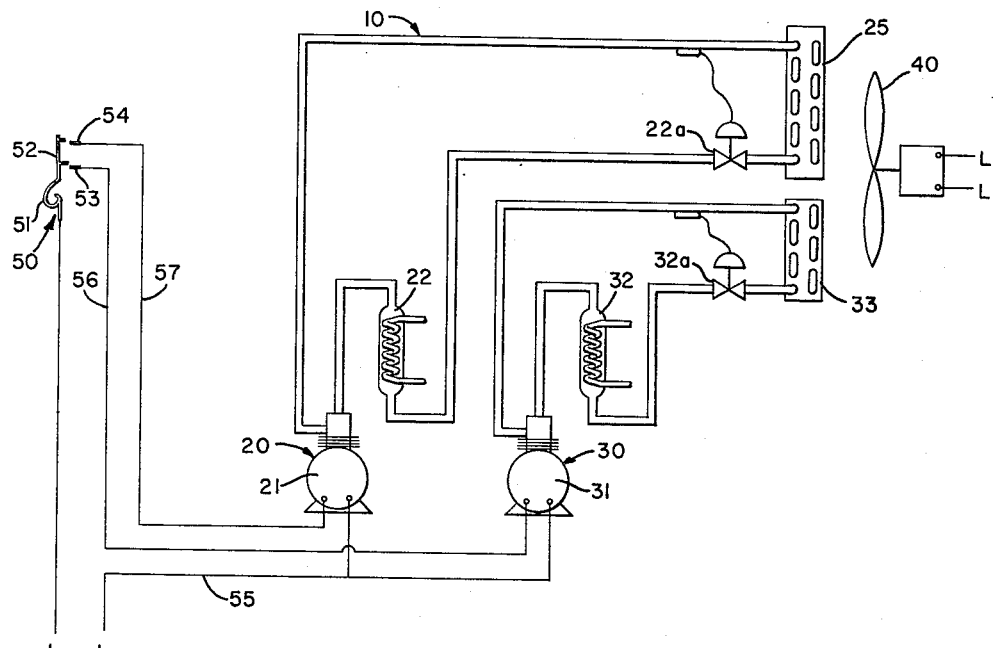
FIG. 1
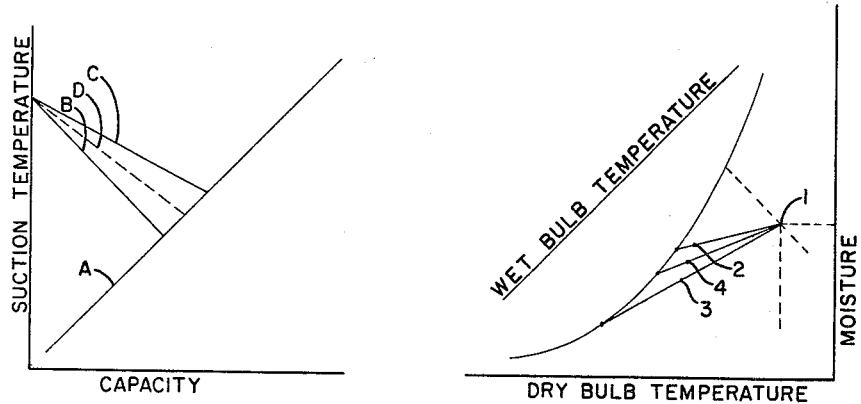
FIG. 2
FIG. 3
INVENTOR.
WILLIAM L. McGRATH
BY *Herman Seid*
ATTORNEY

United States Patent Office 3,059,448
Patented Oct. 23, 1962

3,059,448
AIR CONDITIONING APPARATUS
William L. McGrath, Syracuse, N.Y., assignor to Carrier Corporation, Syracuse, N.Y., a corporation of Delaware
Filed May 1, 1958, Ser. No. 732,341
4 Claims. (Cl. 62—203)

This invention relates to air conditioning apparatus, more particularly to a novel air conditioning apparatus employing a plurality of independent refrigeration systems functioning in a novel manner to increase the effectiveness of said air conditioning apparatus.

Air conditioning apparatus has in the past been devised employing a plurality of refrigeration systems to obtain the desired cooling and dehumidification effects. These refrigeration systems are so arranged and controlled that at least one of them is generally kept operating, whereby rehumidification effects and excessive cycling are eliminated. Under full load conditions, all refrigeration systems are kept functioning, whereas under partial load conditions, only those refrigeration systems required to handle the cooling load are maintained in operation. Conventionally, each of the refrigeration systems employed performs in a similar manner with respect to the final condition of the air passing through each section. The control systems provided employ a thermostatically regulated step switching arrangement with said switching arrangement initiating or deactivating one or more of the refrigeration systems in response to the temperature in the conditioned area. Since one of the primary functions of any air conditioning apparatus is to provide desired humidity conditions in the conditioned area, any controls regulating operation of the refrigeration system in response to the temperature conditions alone, do not necessarily provide these desired humidity conditions. Thus, though the thermostatically controlled switch elements may respond to given desired temperatures indicative of the cooling load, there is no assurance that the humidity conditions in the conditioned area will be adequate. The provision of humidity responsive controls of course is possible, but if such control overrides the thermostatic control excessive cooling will result.

To obviate some of the aforementioned problems, the present means have been evolved, means providing an unequally balanced combination of refrigeration systems in an air conditioning apparatus, whereby under partial load conditions, greater dehumidifying capacity will be provided, and under full cooling load conditions, greater cooling capacity will be provided.

It is accordingly a primary object of this invention to provide an improved multiple refrigeration system air conditioning apparatus.

An additional object of this invention is to provide a novel multiple refrigeration system air conditioning apparatus in which proper dehumidification will be maintained under partial load conditions.

A further object of this invention is to provide means for increasing the latent heat removal without reducing the maximum sensible heat capacity in a multiple refrigeration system air conditioning apparatus.

These, and other objects of the invention which will become apparent from the following disclosure and claims, are achieved by provision of a plurality of refrigeration systems with the cooling or evaporator coils thereof arranged to permit the passage of air thereover from the conditioned area. The refrigeration systems employed are of different latent cooling capacity, and a thermostatically actuated control is provided, which actuates all of the refrigeration systems under full cooling load, and maintains only the refrigeration systems with higher latent heat removal in operation under predetermined partial load conditions. In a preferred embodiment of the invention, difference in moisture removal capacity of the refrigeration systems employed is accomplished by providing different size evaporator coils on the respective refrigeration systems employed. The result of this novel arrangement is that under partial load contions, the unit operating at lower evaporator temperature functions with a higher dehumidifying capacity, whereas under full load conditions, the combined capacity of all of the refrigeration systems gives a sensible heat removal capacity somewhat greater than if all systems were sized conventionally.

A primary feature of this invention resides in the employ of a plurality of differently balanced systems in an air conditioning apparatus, whereby under partial load conditions, dehumidification capacity is increased, and under full load conditions, cooling capacity is maintained at a maximum.

Another feature of the invention is that in a multiple refrigeration system comprising a plurality of refrigeration systems operating at differeing suction temperatures the unit of lower suction temperature is kept in operation after a unit of higher suction temperature has been deactivated, thus minimizing rehumidification effects.

The specific details of a preferred embodiment of the invention, and its mode of functioning, will be made most manifest and particularly pointed out in conjunction with the accompanying drawings, wherein:

FIGURE 1 represents a schematic view of an air conditioning apparatus in accordance with the teaching of this invention, shown here as having two independent refrigeration systems with the cooling or evaporator coils thereof of different size; and FIGURE 2 is a graphic representation of a balance chart in which the respective capacities of the refrigeration systems are plotted against suction temperature; and FIGURE 3 is a skeleton psychrometric chart illustrating the change in air conditions of the air stream passing through the herein disclosed novel air conditioning apparatus in comparison to the conventional arrangement.

In the preferred embodiment of the invention, as schematically illustrated in FIGURE 1, the novel air conditioning apparatus 10 is seen to comprise a refrigeration system 20 with a relatively large evaporator and a refrigeration system 30 with a relatively smaller evaporator with the evaporators of said systems arranged in an air stream produced by fan 40, and with operation of said refrigeration systems regulated by control 50. Both of the refrigeration systems make use of conventional refrigeration compressors of the same size.

Refrigeration system 20 includes a compressor 21, a heat dissipating condenser 22, expansion device 22a and a cooling evaporator coil 25, all arranged in a closed fluid circuit through which refrigerant may flow. Cooling evaporator coil 25 is of a relatively large size, as compared to the hereinafter described cooling coils.

Relatively smaller refrigeration system 30 includes compressor 31, heat dissipating condenser 32, expansion device 32a and relatively small cooling evaporator coil 33, with all of said components arranged in a closed fluid circuit, permitting the flow of refrigerant therethrough.

In the schematic illustration, the evaporator coils 25 and 33 are shown as arranged in tandem banks positioned in the conditioned air stream. It will be apparent, of course, that the particular coil arrangement may be varied to facilitate the passage of air from the conditioned area thereover.

Control system 50, shown schematically, is a thermostatically actuated stepping switch comprising a thermostat 51 regulating the position of switch arm 52 to contact first terminal 53 and then terminal 54 as the temperature affecting the thermostat rises. As seen in the drawing, control 50 is positioned in an electrical circuit, here shown as of a two-wire type, with return line 55 extending from compressors 21 and 31 respectively, and hot supply line 56 extending from switch terminal 53 to compresser 31, and hot line 57 extending from switch terminal 54 to compressor 21.

In order to minimize production costs due to the use of a variety of different components, it is proposed in the preferred illustrated embodiment of the invention to employ as many like components in the different refrigeration systems as possible. Thus the compressors 21 and 31; the condenser coils 22 and 32 and all other feasible parts of the respective refrigeration systems are the same. The difference in balance is obtained by making the evaporator cooling coil 33 smaller than cooling coil 25. A preferred relationship between the cooling surface is one in which the smaller evaporator 33 has a surface area approximately two-thirds of that of cooling coil 25.

Operation

Apparatus 10, as schematically illustrated in FIGURE 1, is designed for operation, controlled by control 50. Under full load conditions, switch arm 52 closes a circuit through switch terminals 53 and 54 actuating compressors 31 and 21 respectively, causing the flow of refrigerant through refrigeration systems 20 and 30. The passage of air from the conditioned area as produced by fan 40 over cooling evaporator coils 25 and 33 results in an exchange of heat between the air and the cooling coils in conventional fashion.

Under partial load conditions, thermostat 51 causes switch arm 52 to break contact with switch terminal 54, thus deactivating the higher temperature refrigeration system 20, and maintaining the lower temperature refrigeration system 30 in operation. The fact that only a portion of the cooling equipment is cycled under partial load, minimizes voltage dips such as would occur if a single refrigeration system, having a capacity equal to that of both refrigeration systems here shown, was cycled.

The advantages flowing from the herein disclosed novel arrangement are made apparent on the capacity curve plotted in FIGURE 2. Here an exponential scale of evaporator temperature is indicated along the ordinate, and capacity along the abscissa. Curve A is the capacity curve of a compressor which is shown to increase with suction temperature. Curve B represents the capacity curve of evaporator 33 which decreases as evaporator temperature decreases. Line C represents the capacity curve of larger capacity evaporator 25. The point of balance of refrigeration systems 20 and 30, which have been here shown as employing compressors of equal size, as plotted on line A, will be represented by the intersection of lines B and C respectively, with compressor curve A.

On the skeleton psychrometric chart illustrated in FIGURE 3, the condition of the entering air stream as it enters the apparatus 10, is shown at point 1. The condition of the larger portion of the air after passing over the relatively larger evaporator coil 25 of the apparatus is shown plotted at point 2, and point 3 represents the condition of the smaller portion of air after passing over relatively smaller coil 33.

On both these graphs (of FIGURES 2 and 3), the dotted line curve shown represents the operation of a multiple refrigeration system, with each of the refrigeration systems employed having equal evaporator capacity. Point 4 on the skeleton psychrometric chart represents the condition of the air leaving the cooling coils of a multiple refrigeration system air conditioning apparatus.

It will be observed from the psychrometric chart that the moisture content of the air passing over the relatively smaller cooling evaporator coil 33 is considerably less than that of the air passing over the relatively larger evaporator 25, or over an evaporator of a conventional equal capacity multiple refrigeration system. The result is that under partial cooling load conditions, the novel air conditioning system produces lower relative humidities than would normally be available. Additionally the sensible heat capacity provided by the novel arrangement may actually produce a higher sensible heat capacity with both systems than would be available by a conventional multiple refrigeration system.

Some results which will further exemplify the mode of functioning of the herein disclosed novel arrangement may be seen from the following empirical analysis. Thus in a conventional multiple refrigeration system air conditioning installation employing two refrigeration systems each having a capacity of 7,500 B.t.u.'s per hour to give a total of 15,000 B.t.u.'s per hour for the composite system, 11,250 B.t.u.'s are sensible and 3,750 B.t.u.'s are latent. In a system such as described herein providing evaporator cooling surfaces having a relative area to the whole of 42% and 58%, a multiple refrigeration system apparatus employing identical compressors and condensers proved to have a total capacity of 14,950 B.t.u.'s per hour, of which 11,490 is sensible heat, and 3,460 is latent heat. It is thus seen that with substantially identical total capacity, somewhat greater sensible heat capacity can be obtained under full load conditions.

At partial load, much better dehumidifying is obtained with the proposed method because the system which operates at the low suction temperature and low dew point is kept in operation. For example, analyzing the same system at 50% load, the conventional split would give a total latent heat capacity of 1,875 B.t.u.'s per hour, whereas splitting the surface in the manner proposed, would give at 50% load a latent heat capacity of 2,340 B.t.u.'s per hour, or 25% higher. While the above example was worked out based on a fixed entering air condition, it is obvious that under fixed heat gain conditions the greater dehumidifying capacity will result in lower relative humidity with the proposed system during periods of partial load than is available with the conventional method.

It will be apparent that variations in performance to attain the novel results of this invention may be achieved by changing the capacity of any of the components of the system. Thus unequal balance may be achieved by using differently sized evaporators, compressors, or condensers.

The above disclosure has been given by way of illustration and elucidation, and not by way of limitation and it is desired to protect all embodiments of the herein disclosed inventive concept within the scope of the appended claims.

I claim:

1. In air conditioning apparatus including a plurality of cooling coils arranged one above the other, each cooling coil being a component of a separate refrigeration system with one of said refrigeration systems being operable to provide an operating cooling coil temperature lower than the operating cooling coil temperature of any of the other cooling coils, means for passing a common air stream over the coils, and control means operative in response to a predetermined temperature of air subject to the operation of the apparatus for maintaining operation of the refrigeration system including the lowest temperature cooling coil while inactivating at least one of the other refrigeration systems to increase latent heat removal of the air passing over the coils.

2. The invention set forth in claim 1 wherein the cooling coil associated with the refrigeration system operating at the lowest cooling coil temperature contains less surface area than the surface area of any of the other cooling coils.

3. The invention set forth in claim 2 wherein the portion of said cooling coil surface utilized in the lower temperature cooling coil is between 35% and 45% of the total.

4. Air conditioning apparatus comprising: a first refrigeration system employing a relatively small capacity cooling coil; a second refrigeration system employing a relatively large capacity cooling coil; said systems being arranged so that the cooling coil of one is disposed above the cooling coil of the other, a fan for directing an air stream across said cooling coils; and a thermostatically responsive control regulating the operation of said refrigeration systems to make both systems operative under full load conditions and only said first system under predetermined partial load conditions.

References Cited in the file of this patent

UNITED STATES PATENTS

| | | |
|---|---|---|
| 2,071,178 | Roessler | Feb. 16, 1937 |
| 2,204,394 | Bailey | June 11, 1940 |
| 2,241,033 | Huggins | May 6, 1941 |
| 2,350,886 | Freimann | June 6, 1944 |
| 2,663,156 | Baker | Dec. 22, 1953 |
| 2,692,481 | Schweller | Oct. 26, 1954 |
| 2,747,377 | Lowensohn | May 29, 1956 |
| 2,769,314 | Wheeler | Nov. 6, 1956 |